United States Patent [19]
Young et al.

[11] 4,066,970
[45] Jan. 3, 1978

[54] PULSE SHAPER FOR COAXIAL CABLE SYSTEM

[75] Inventors: Jonathan D. Young, Worthington; Ross Caldecott, Columbus, both of Ohio

[73] Assignee: The Ohio State University, Columbus, Ohio

[21] Appl. No.: 775,385

[22] Filed: Mar. 7, 1977

Related U.S. Application Data

[60] Division of Ser. No. 665,924, March 11, 1976, Pat. No. 4,028,707, which is a continuation-in-part of Ser. No. 437,927, Jan. 30, 1974, Pat. No. 3,967,282.

[51] Int. Cl.$^2$ .......................... H03K 3/86; H03K 3/53
[52] U.S. Cl. ........................................ 328/67; 328/65; 307/268
[58] Field of Search ................... 328/67, 65; 307/268

[56] References Cited

U.S. PATENT DOCUMENTS

| 2,646,503 | 7/1953 | Winter | 328/67 X |
| 2,693,532 | 11/1954 | Krienen | 328/67 |
| 3,100,872 | 8/1963 | Hickey et al. | 328/67 |

Primary Examiner—John S. Heyman
Attorney, Agent, or Firm—Sidney W. Millard

[57] ABSTRACT

A synchronizing, pick-off type circuit for use with underground detection systems of a variety utilizing a high voltage pulse generator generating pulses by dielectric breakdown over a gap and evidencing a sustained and discernable substantially lower voltage level for a short interval following the pulse. Pick-off is derived by tapping a transmitting coaxial cable with a "T" connection carrying a choke inductor and a resistor, each of which is coupled to the central conductor of the coaxial cable and which are mutually connected in parallel circuit relationship.

5 Claims, 4 Drawing Figures

PULSE SHAPER FOR COAXIAL CABLE SYSTEM

BACKGROUND OF THE INVENTION

This application is a division of our copending application Ser. No. 665,924 filed Mar. 11, 1976, now U.S. Pat. No. 4,028,707, which is a continuation-in-part of our application Ser. No. 437,927 filed Jan. 30, 1974, now U.S. Pat. No. 3,967,282.

In U.S. Pat. No. 3,967,282, an Underground Pipe Detection System is described which utilizes an antenna described in detail in copending U.S. application Ser. No. 665,924 filed Mar. 11, 1976. The operation of this detector system depends at least in part on the generation of a high voltage pulse of significantly short duration, for example, in the range of 150 pico-seconds. Resonse of the antenna system to a pulse transmitted therethrough under these conditions becomes difficult to ascertain. Consequently, the noted patent teaches an arrangement wherein the reflections from successively generated transmit pulses are sampled or analyzed at progressively increasing intervals. These intervals, however, have a consistent repetition over the broader interval designated by the sweep-period of a readout circuit.

To achieve the requisite timing for sampling intervals, a series of fast ramp signals are compared with a simultaneously generated relatively slow ramp controlling circuit of the readout system to define progressively varying points of voltage equivalents between the ramps. With such an arrangement, a periodic sampling of reflected waves is carried out. In consequence of this, transmitted and received detecting signals, even though formed within an extremely narrow time interval, may be analyzed with effectiveness to derive an output representative of the location of objects buried beneath the terrestrial surface.

Obviously, it is necessary to synchronize transmission of the very narrow and extremely high voltage transmission pulse with the readout system associated with the antenna and transmitting media. For this purpose, the coaxial cable leading from the pulse generator must be operated upon in some manner wherein a properly synchronized input triggering the noted fast ramp generator is derived.

Conventional approaches to achieving an appropriate synchronization, for example, by monitoring a triggering network, are not available, inasmuch as the noted high voltage transmission pulses are generated somewhat randomly.

SUMMARY OF THE INVENTION

The present invention looks to a solution to achieving a pick-off of the transmitted signal within such a coaxial lead. This pick-off uniquely is entirely dependent upon the characteristic of the transmit pulse. For example, following the development of a spike representing the noted thousand volt peak and having a transmission time of about 150 pico-seconds, it is characteristic of such generators to develop a substantially lower voltage level output, for instance of about 30 volts, over a relatively extended interval, for example in the microsecond range. The instant invention looks particularly to a technique for evolving a periodic square wave shaped signal from the generator output, the leading and trailing edges of which are utilized for the purposes of synchronizing the noted fast ramp generator.

BRIEF DESCRIPTION OF THE DRAWINGS

FIG. 1 is a schematic representation of an underground pipe detector;

FIG. 2 is a perspective view of the antenna used in connection with this invention;

FIG. 3 is a section 3—3 taken through FIG. 2; and

FIG. 4 is a schematic diagram of a trigger pick-of circuit which is connected to the output of a gas breakdown type pulse generator to provide a sustained trigger signal.

DETAILED DESCRIPTION OF THE DRAWINGS

I. General System

The basic operation of an underground impulse radar can be explained with the help of the block diagram in FIG. 1. A means for generating signals from the target includes an impulse source 10 (IKOR Model R100 or other adequate source) which typically produces a very short video pulse of approximately $150 \times 10^{-12}$ sec duration and 1000 v peak amplitude although some variation is permitted. This pulse duration is much shorter than conventional radar practice. Furthermore, where a normal radar has 1% bandwidth about its carrier frequency, a carrier frequency cannot be defined for this video pulse, whose output spectrum is spread from 250 Hz (its pulse repetition rate) to beyond 5 GHz.

The transducer probe 12 radiates the impulsive energy into the ground and receives any echoes. The spectrum of the radiated signal lies between about 1 MHz and 300 MHz for probes now in use. At these frequencies, the undisturbed ground acts as a lossy, homogeneous dielectric, and the impulsive electromgnetic wavefront propagates with little distortion. When the transmitted energy encounters any abrupt constitutive parameter changes, as echo is produced. A dielectric constant change (such as a plastic pipe), a conductivity change (such as a metal pipe) or a permeability change (such as an iron ore pocket) can all produce such an echo. For most targets of interest, the incident wavefront excites some resonant scattering modes and the echo has a characteristic time domain shape or signature. Target identification based on time domain signatures has been performed on free space targets, and some characteristic features of underground objects have also been observed. Target return echoes are received by the probe after a time delay probe proportional to round-trip distance or target depth. Because of the very short pulse duration, depth resolution significantly better then 1 ft. can be achieved by a system of this type. The strength of the return depends on depth and also on the target position with respect to the probe and the directional radiation properties of the probe. These antenna-directional characteristics are used to determine the location of the target. Antennas have been developed which indicate that they are directly over the target with accuracies of plus or minus 1 ft.

The signal 14 is reflected by a target 16. The transducer probe 12 which includes the antenna detects a reflected signal 17 and transmits it to a processor 18.

II. Impulse Source

In general, the attenuation rate of signals traveling underground is quite high, due largely to the presence of moisture. As a result, it was found necessary to employ a relatively high power pulse source in order to have an adequate signal-to-noise ratio in the receiving system. The impulse source pulse generator selected was a Model R100 IMP Generator manufactured by Ikor Incorporated, although other sources could be used. This unit, described in U.S. Pat. No. 3,521,121, generates a pulse of about 1 KV amplitude and about 150 pico-seconds in length at a repetition rate of 250 Hz. It consists essentially of a capacitor, charged by a circuit similar to a radar modulator at a repetition rate of 250 Hz, and a gas breakdown tube. When the voltage on the capacitor reaches the breakdown point of the gas tube, the latter conducts and a pulse is generated. The type of gas breakdown tube is described for example in U.S. Pat. No. 3,521,121 and essentially is present as a coaxial type tube having a center conductor terminating in a gap and fed through a charging resistor from a relatively broad input pulse of about 3,000 volt level. The initial inner conductor in the tube, operating in conjunction with the shell thereof, serves as the noted capacitor and following a sufficient buildup of voltage along such conductor the device generates a gap discharge to derive the requisite 150 pico-second, thousand volt transmit pulse. It should be noted that the 3,000 volt pulse input to the discharge tube cannot, in and of itself, be used for synchronizing procedures, inasmuch as the instant of gap breakdown is unpredictable. Accordingly, since the exact time of the pulse depends on the moment of breakdown of the gas tube, no pre-trigger is available. A trigger for the display circuits must, therefore, be obtained from the output pulse itself and sufficient delay included in the received signal line to allow the display circuits to be initiated before the received signal arrives. This has not been a problem where long transmission lines have generally been used to connect equipment inside the Laboratory with an outdoor antenna probe and where an oscilloscope with a low level trigger input was used. Where the various components are physically close, however, it is necessary to include a delay line in the pulse path to allow sufficient time for the display circuits to trigger. The sampling circuit used in the prototype also requires a trigger signal of at least 15 volts and must be sustained as long as any significant information is being received. To provide this requirement, a special pulse former circuit had to be designed which would provide the necessary signal from the pulse generator output. The circuit makes use of the residual DC level present on the pulse generator output after the pulse but before the gas tube ceases to conduct.

The pulse former circuit is illustrated in FIG. 4. FIG. 4 shows, in schematic fashion, a conventional transmitting coaxial cable having a central conducting component surrounded by a conductive outer sheath. This coaxial cable is "tapped" in somewhat typical form by a "T-connector" having a similar conductive outer sheath. The internal diameter of the probing connection may, for example, be in the range of about ¼ inch. The circuit includes a choke connected parallel to a 2000 ohm resistor which together are connected at their input to the central component of transmission line 192 which extends from the pulse generator output to the transmitting arms of the antenna. A series diode 193 and shunt diode 194 connect the choke 190 and resistor 191 to the sampler input which is terminated in a 100 ohm resistor 195.

The residual DC level is connected via the choke 190 in the pick-off circuit to provide the sustaining voltage for the sampler trigger. The initial fast rise for the trigger is obtained by tapping off a small part of the transmitted pulse through the 2000 ohm resistor 191 in parallel with the choke 190. Diodes 193 and 194 prevent any premature shut off which might result from a negative reflected pulse arriving back at the source point. The short length of cable 196 acts as a capacitance along its length. This capacitance, in combination with the load to the circuit, forms an RC filter which tends to improve the requisite square wave gating or enabling output signal.

An antenna with which the trigger signal generating circuit of the invention may operate is illustrated in FIGS. 2 and 3. Looking to those figures, means for transmitting and receiving signals 19 generally include a first set of arms 20 and 21 which are used to transmit the signals and a second set of arms 22 and 23 which are used to receive the reflected signals. The first set of arms being substantially perpendicular to the second set of arms.

The U-shaped arms are formed of ⅜ in. diameter copper tubing and each of them have one of their ends connected to resistors 28, 29, 30 and 31 of about 190 ohms. The other end of each resistor is connected to a central hub 34. The lower ends of arms 20, 21, 22 and 23 are connected to respective insulated coaxial cables 36, 37, 38 and 39 which are also insulated from one another and which pass up through the tubes 35 and 44. A universal joint 42 attached to a handle 44 permits easy adjustment of handle 44 relative to the arms.

A dielectric material 46, e.g. plywood separates the legs of each U-shaped arm and is held in place by collar 47. An absorber 48 which may be Hairflex is operatively attached to the underside of the antenna and surrounds trim tabs 49. The sensitivity of this antenna probe is chiefly dependent on its length and a 4 ft. length of the final version was found to give adequate signal-to-clutter ratio for the pipe targets to be measured. The inwardly disposed conductive lines within coaxial cables 36–39 are electrically attached to the lower ends of respective arms 20–23, while the outer conductive sheaths of the cables pass through and are electrically connected to the bottom surface of collar 47. Accordingly, short duration pulse transmission is derived from the above-noted transmitting balun transformer and is directed simultaneously in opposed polar sense along cables 36 and 37 to respective arms 20 and 21. The conductive sheaths of all cables 36–39 are commonly connected at collar 47. In similar fashion, the inwardly disposed conductive lines of receiving coaxial cables 38 and 39 are coupled to the lower segments of respective receiving arms 22 and 23, while their conductive sheaths are commonly connected at collar 47. As above, reception of a given signal is delivered in opposed polar sense through cables 38 and 39 for conventional delivery to a reception balun.

The dispersion performance of the probe has been controlled by the resistive loading and folding of the elements. A normal dipole element causes significant pulse dispersion. It appears to radiate one undistorted pulse from the center feed, followed by successive pulses emanating from the tips, and later feed region reflections. By folding the antenna, and putting load resistors at the "far" end, the tip radiation was largely eliminated. The bound energy on the element proceeds around the folded portion and is absorbed by the load resistors 28, 29, 30 and 31. The 2 in. thick Hairflex absorber 48 between the element and the ground surface provides distributed loading, as does the grass and ground itself. The absorber 48 was also found to keep the antenna performance more consistent when it was placed on a nearly lossless surface, such as a concrete sidewalk.

The transmit-receive isolation of this probe depends mainly on the orthogonality of the transmit and receive elements. Since perfect orthogonality could not be achieved at the feed terminals, small metal trim tabs 49 were added. These have been adjusted to give good isolation in the input terminal region. It was found that bumps in the ground surface, tufts of grass, etc. can also degrade isolation. The absorber 48 between the antenna and the ground helps minimize these effects. Experimentation has determined that an absorber layer about 2 in. thick was the best compromise for minimizing ground clutter while not degradng antenna sensitivity. Resistive loading also afffects the coupling by damping out any coupled signal quickly. Thus, the residual coupling at the terminal region is brief enough that it does not mask the expected returns from buried pipes.

The radiation pattern and polarization performance of the probe array are dictated by its crossed-dipole nature. Each element radiates (or receives) energy with $\overline{E}$ field polarized parallel to the element wires. Thus, the pipe reflection is strongest when the pipe is oriented at a 45° angle with respect to the two elements. Pipe echo response is theoretically zero for a pipe located parallel to either element.

The impedance of the transmit and receive elements of the probe antenna depends on the dielectric material 46 (plywood) to which they are mounted, the absorber, and the load resistors.

Changes in the circuitry and other components will be obvious to one skilled in the art, and should be considered a part of this invention.

We claim:

1. For use in conjunction with a high voltage pulse generator of the coaxial tube type wherein a charge is capacitively accumulated at one side of a gap within said tube until dielectric breakdown occurs thereacross to produce an output signal at an opposite side of said gap, said opposite side being connected with a coaxial cable having a central conductor and an outer conductive sheath, said output signal being characterized by a high voltage pulse signal portion of very short duration and a contiguous, subsequent sustained signal portion of substantially lower voltage, the improved generating circuit for forming substantially sustained trigger signals from the two said output signal portions and asserting said trigger signals at a load, said generating circuit comprising:
    a resistance connected to said central conductor for acting in voltage dividing relationship with said load for forming a portion of sustained trigger signal; and
    a choke coupled in parallel circuit relationship with said resistance for forming another portion of said sustained trigger signal.

2. The improved sustained trigger signal generating circuit of claim 1 wherein said trigger circuit is enclosed within an outer conductive sheath for deriving a capacitance operatively associated with the resistance of said load to form an RC filter, so as to improve the voltage characteristic of said sustained trigger signal.

3. The improved sustained trigger signal generating circuit of claim 2 in which said choke and resistance are mounted within a coaxial cable "T" coupling assembly.

4. The improved sustained trigger signal generating circuit of claim 2 including diode means coupled between said outer conductive sheath enclosing said trigger circuit and said parallel coupled resistance and choke.

5. The improved sustained trigger signal generating circuit of claim 4 including blocking diode means coupled between said load and said parallel coupled resistance and choke for blocking signals representative of negative reflective pulses.

* * * * *